United States Patent
Gielda et al.

(10) Patent No.: US 6,505,886 B2
(45) Date of Patent: Jan. 14, 2003

(54) CLIMATIZED SEAT WITH VORTEX TUBE

(75) Inventors: Thomas Paul Gielda, Brighton, MI (US); Yohannes Ambaye, Plymouth, MI (US); Scot Karath, White Lake, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/825,811

(22) Filed: Apr. 4, 2001

(65) Prior Publication Data

US 2002/0145312 A1 Oct. 10, 2002

(51) Int. Cl.$^7$ ................................................ A47C 7/74
(52) U.S. Cl. ............................ 297/180.13; 297/180.1; 297/180.14
(58) Field of Search ..................... 297/180.13, 180.1, 297/180.14

(56) References Cited

U.S. PATENT DOCUMENTS

| | | | | |
|---|---|---|---|---|
| 5,160,517 A | * | 11/1992 | Hicks et al. | 297/180.14 X |
| 5,385,382 A | * | 1/1995 | Single, II et al. | 297/180.13 |
| 5,626,386 A | * | 5/1997 | Lush | 297/180.13 |
| 5,924,766 A | * | 7/1999 | Esaki et al. | 297/180.13 |
| 6,059,018 A | * | 5/2000 | Yoshinori et al. | 297/180.13 X |
| 6,158,812 A | * | 12/2000 | Bonke | 297/391 |

OTHER PUBLICATIONS

Exair Vortex Tubes, http://www.exair.com/vortextubes/vt_frmain.htm, Feb. 1, 2001.
Stainless Steel Vortex Tubes at Works, wysiwyg://63/http://www.artxltd.com/vortex/principle.shtml, Nov. 3, 2000.
Exair a Phenomenon of Physics, http://www.exair.com/vortextube/vt_theory.htm, Nov. 3, 2000.
Vortex Heating and Cooling Using Air Pressure, wysiwyg://75/http://energy21.terrashare.com/vortex.htm, Nov. 3, 2000.

* cited by examiner

Primary Examiner—Rodney B. White
(74) Attorney, Agent, or Firm—Brinks Hofer Gilson & Lione

(57) ABSTRACT

A climatized seat utilizing a vortex tube is provided. The vortex tube separates compressed air into hot and cold air streams, which are used to heat and cool the seat. In a preferred embodiment, the seat includes a vortex tube, communicative passageways connected to the ends of the vortex tube and the seat, and one or more valves for regulating airflow from the ends of the vortex tube and the environment surrounding the seat. A system for regulating seat temperature is also provided. In one embodiment, the system comprises one or more seats, one or more vortex tubes, various communicative passageways and valves, a source of compressed air, and an accumulator for storing compressed air.

27 Claims, 3 Drawing Sheets

CLIMATIZED SEAT WITH VORTEX TUBE

FIELD OF THE INVENTION

The present invention relates to seats that utilize a vortex tube as a source of hot and cold air streams for heating and cooling the seat surface.

BACKGROUND OF THE INVENTION

Climatized seats, also known as heated and/or cooled seats, are becoming more popular in a variety of vehicles. Many modern automobiles include seats that allow a user to selectively heat or cool the surface of the seat depending on their preferences. Typically, these seats include some type of heating and/or cooling element, a temperature control that allows the user to select a desired temperature and/or heat level, and a mechanism for achieving the selected temperature or heat level. Frequently, the heating element comprises a heated electrical pad, a Peltier junction, or even ductwork from the vehicle heating and air conditioning system.

SUMMARY OF THE INVENTION

The present invention provides a climatized seat that makes use of a vortex tube to alter the temperature of the seat surface. Vortex tubes separate compressed air into hot and cold air streams. The individual streams are directed out of opposite ends of the vortex tube. By regulating the flow of both hot and cold air from the vortex tube, a selected temperature and/or heat level can be achieved in the seat surface. The seat may further comprise ductwork that channels the air streams from the two ends of the vortex tube into the seat and even toward the seat surface. Further, the seat may include a connector that mixes the air streams from the opposite ends of the vortex tube, which greatly expands the range of temperatures that can be achieved. Also, the ductwork or connector may include a door, flap, or other type of valve for allowing air from the passenger cabin to circulate toward the seat surface. This allows for a ventilation effect on the seat when heating or cooling is not desired.

DETAILED DESCRIPTION OF THE PREFERRED EMBODIMENT OF THE INVENTION

The following description of a preferred embodiment of the invention provides an example of the present invention. The embodiment discussed herein is merely exemplary in nature, and is not intended to limit the scope of the invention in any manner. Rather, the description of this preferred embodiment serves to enable a person of ordinary skill in the relevant art to make and use the present invention.

Figure 1:
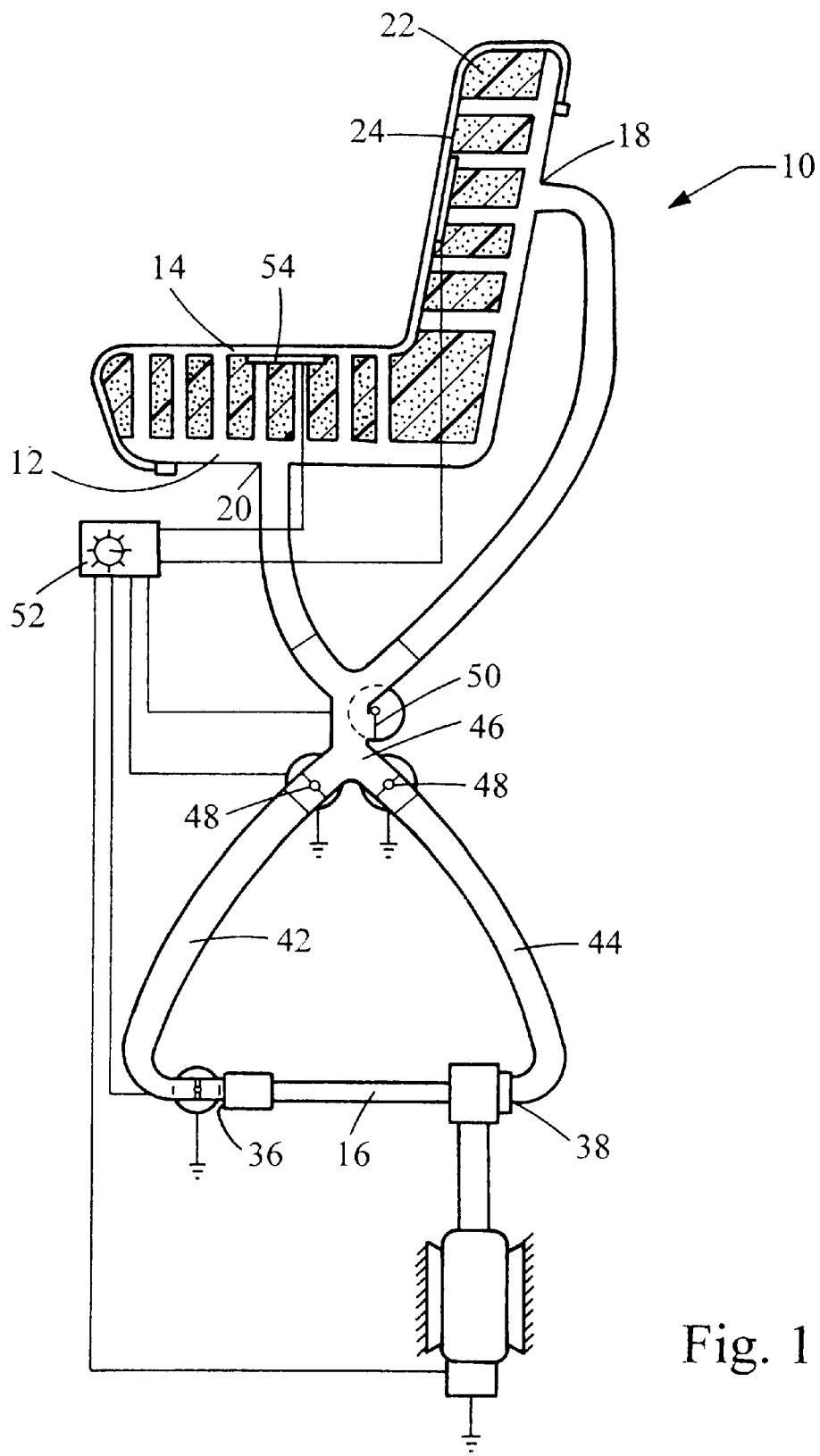
FIG. 1 is a cross-sectional view of a climatized seat in accordance with the present invention.

The present invention provides a climatized seat, which is generally indicated in FIG. 1 at reference 10. The climatized seat 10 preferably comprises a frame 12, a support surface 14, and a vortex tube 16. The term "seat" is not meant to limit the scope of the present invention. As used herein, the term "seat" encompasses any surface that is useful for supporting an individual or a portion of an individual. For example, the present invention can easily be applied to mattresses or outer surfaces used to support individuals. Preferably, the seat 10 comprises a seat in a vehicle, such as an automobile or a passenger truck.

The frame 12 provides one or more structural members that defines the shape of the seat 10. Preferably, the frame 12 comprises a series of metal structural members, such as rails, posts, and/or beams that define lower and upper portions of the support surface 14. Alternatively, the frame 12 can be made from any material suitable for providing structure to the seat 10. Also alternatively, the structural members of the frame 12 can be arranged in any manner that allows the seat 10 to accomplish its function as a support.

Preferably, the seat 10 includes at least one opening 18 to provide access to the interior of the seat 10. As will be developed more fully below, the opening 18 can be used to direct airflow from the vortex tube 16 into the interior of the seat 10. FIG. 1 illustrates a preferred position of opening 18 on the frame 12. In this embodiment, the frame includes a second opening 20. The first opening 18 is preferably positioned opposite the upper portion of the support surface 14 and the second opening 20 is preferably positioned opposite the lower portion of the support surface 14. Alternatively, any number and arrangement of openings can be positioned on the frame 12 of the seat 10. The openings 18, 20 preferably comprise conduits that allow communication with the interior of the seat.

The support surface 14 comprises a surface on which an individual or individuals can rest their body or portion thereof. Preferably, the support surface 14 comprises a cushion or other comfortable surface that is disposed around the frame 12. As illustrated in FIG. 1, the support surface 14 preferably comprises a foam inner core 22 surrounded by an outer skin 24. Preferably, the foam of the inner core 22 is porous in nature, thereby being adapted to allow air to pass through the inner core 22 while providing a comfortable surface on which an individual can position themself. Also preferable, the outer skin 24 comprises a breathable material, such as leather containing holes at regular intervals.

It should be noted that the frame 12, support surface 14, inner core 22, and outer skin 24 can comprise any material or configuration suitable for use in a seat or any other surface or device for supporting an individual or portion of an individual.

Figure 2:
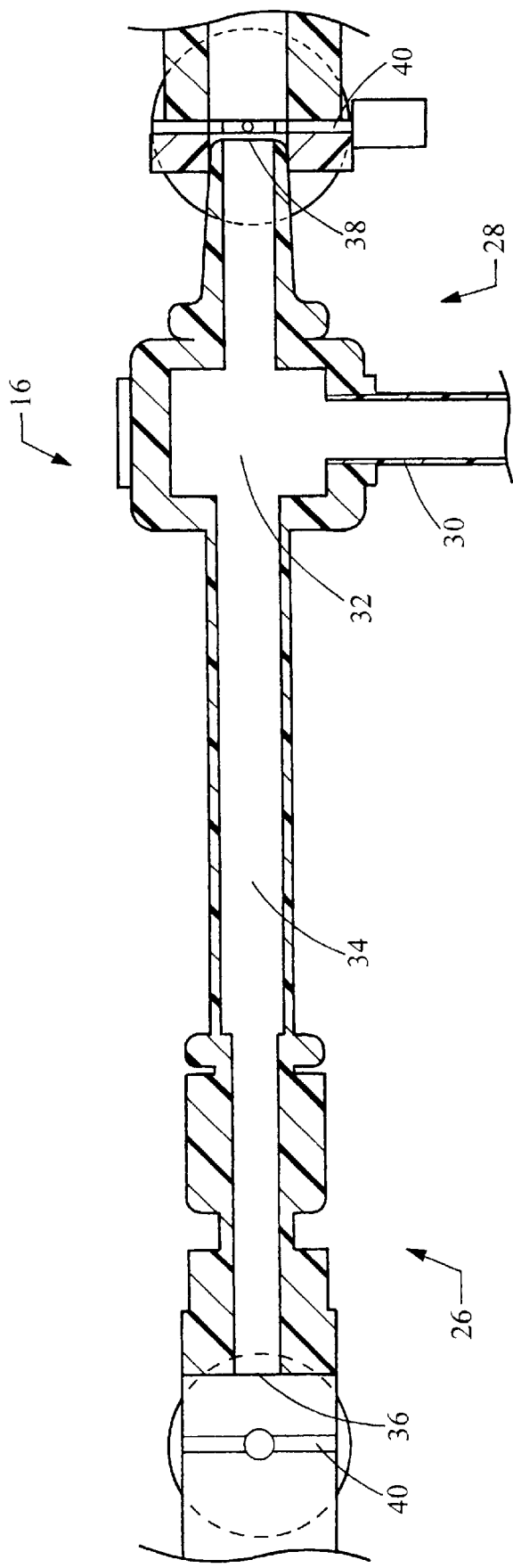
FIG. 2 is a cross-sectional view of a vortex tube suitable for use in the present invention.

FIG. 2 illustrates the details of the vortex tube 16. The vortex tube 16 is commonly referred to by a number of different names, including a "Hilsch tube" and "Maxwell's demon". The vortex tube 16 is a device that separates compressed air into hot and cold air streams. The vortex tube 16 comprises a first end 26, a second end 28, and an inlet 30. The inlet 30 provides a tangential entrance to a spin chamber 32 located on the interior of the vortex tube 16. The spin chamber 32 is in communication with an elongated main chamber 34 that extends from the first end 26 to the second end 28. The main chamber 34 terminates in first 36 and second 38 openings. Preferably, a control valve 40 is located on at least one of the ends 26, 28 of the vortex tube 16. The control valve 40 alters the size of the appropriate opening 36, 38 to regulate the quantity of air exiting the vortex tube at the respective end 26, 28. As shown in FIG. 2, it is particularly preferred to include a control valve on both the first 26 and the second 28 ends. Of course, it is not necessary to include a control valve 40 on either end 26, 28 of the vortex tube.

The mechanism by which vortex tubes operate is still the subject of debate. A commonly accepted theory posits that compressed air, supplied to the vortex tube 16 through the inlet 30 is set into a vortex motion within the spin chamber 32. This mainstream of air turns 90° and passes down the elongated main chamber 34 toward the first opening 36. While in the elongated main chamber 34, the air takes the form of a spinning shell, creating a high-pressure area in the outer region of the shell, and a low-pressure area in the inner portion of the shell. Air in the high-pressure area is warmed, and exits the vortex tube 16 as hot air at the first end 26 through the first opening 36. The remaining air changes direction in the elongated main chamber 34 and ultimately exits the vortex tube 16 at the second end 28 through the second opening 38. As this portion of the air travels through the elongated main chamber 34, it loses heat energy and exits as cold air.

The cold fraction of the vortex tube 16 is the percentage of input compressed air that is released through the second 28 end, or cold end, of the tube 16. As a rule of thumb, the smaller the cold fraction, the colder the air will be that exits the second end 28. The preferred application to which the present invention will be applied is the heating of seats in an automobile. As such, obtaining air of low temperature from the vortex tube 16 is not critical. Indeed, the cold air stream need not enter the seat if only heating is desired. As a result, the preferred vortex tube 16 has a cold fraction of up to and including 60%. Of course, it is conceivable that extreme temperatures, either hot or cold, on the support surface 14 would be desirable, and therefore the vortex tube 16 can alternatively have any cold fraction.

While the vortex tube 16 does not contain any moving parts, the tube 16 may generate noise during operation. As a result, it may be desirable to position the vortex tube 16 at a distance from the seat 10. This remote location of the vortex tube 16 would help to ensure that an individual positioned on the seat 10 does not hear the noise generated by the tube 16. In the preferred application, in which the seat 10 comprises a seat in an automobile, the vortex tube 16 can be positioned in a variety of locations, such as under the seat 10, under the floorboard, or even behind the instrument panel. Essentially any remote location can be utilized so long as the air streams exiting the vortex tube 16 can reach the seat 10.

To facilitate this remote positioning of the vortex tube 16, the climatized seat 10 preferably includes at least one passageway that provides communication between the vortex tube 16 and the seat 10. As illustrated in FIG. 1, the seat 10 preferably includes a first passageway 42 connected to the first end 28 of the vortex tube 16, and a second passageway 44 connected to the second end 30. The opposite ends of the passageways 42,44 are connected to the openings 18,20 of the seat 10. In this arrangement, the passageways 42, 44 provide communication between the first 36 and second 38 openings, respectively, of the vortex tube 16. Thus, the first passageway 42 directs hot air from the first opening 36 of the vortex tube 16 through the openings 18,20 and toward the seat 10. Likewise, the second passageway 44 directs cold air from the second opening 38 of the vortex tube 16 to the openings 18,20 and toward the seat 10. Alternatively, if remote positioning of the vortex tube 16 is not desired, one or both of the passageways 42,44 can be shortened or even eliminated as appropriate. Furthermore, if only heating is desired, the cold air stream need not be directed toward the seat 10 at all. Also, the vortex tube 16 can be positioned directly in the seat 10 such that neither of the passageways 42, 44 are necessary. It should be noted, though, that even with the vortex tube 16 positioned within the seat 10, the use of one or more passageways may be desirable such that hot or cold air can be directed to specific areas or regions of the seat 10.

To use the vortex tube 16 to climatize the seat 10, it is desirable to mix the hot and cold air streams exiting from the vortex tube 16. Therefore, it is preferred that the first 42 and second 44 passageways converge into a common junction 46. This junction 46 ensures the mixing of the streams and distribution of air to the seat 10 that represents a mixture of the streams. That is, the junction 46 insures that cold air is not distributed to one portion of the support surface 14 while hot air is distributed to another portion. Of course, if this type of distribution of air is desired, the junction 46 need not be present. Preferably, as illustrated in FIG. 1, the junction 46 joins the first 42 and second 44 passageways on one end, and redistributes the mixed air into duplicate first 42 and second 44 passageways on the other hand. To accomplish this, the junction 46 preferably comprises a double—Y structure. Alternatively, the junction 46 can join the two streams into a single output passageway. In this embodiment, not illustrated in the figures, the junction 46 would have a single—Y structure.

As indicated above, the vortex tube 16 can include one or more control valves 40 to regulate the amount of air exiting from one or both of the ends 26, 28. In addition to or in lieu of the valves 40 positioned on the ends 26, 28 of the vortex tube 16, one or more in line valves 48 can be positioned in one or both of the passageways 42, 44. Furthermore, one or more valves 48 can be positioned within the junction 46. Preferably, as illustrated in FIG. 1, the junction 46 includes two in line valves 48. One valve 48 is positioned to regulate air entering the junction 46 from the first end 26 of the vortex tube 16 and the other is positioned to regulate air entering the junction 46 from the second end 28. Also preferable, the junction 46 includes an access valve 50 that allows air external to the passageways 42, 44 and junction 46 to enter. This valve 50 can be used to provide ventilation to the seat 10. Ventilation could be desired, for example, when neither heating or cooling of the seat 10 is desired.

The various valves 40, 48, 50 are preferably controlled by a stepper motor 52 or other device capable of regulating the extent to which the valves are opened or closed. Also preferable, a common temperature sensor or probe 54 is positioned near the support surface 14 in a manner that allows it to monitor the temperature of the support surface 14. Preferably, the sensor or probe 54 is connected to the stepper motor 52 and controls the motor 52 such that the various valves 40, 48, 50 are manipulated in response to the temperature detected by the sensor or probe 54.

Figure 3:
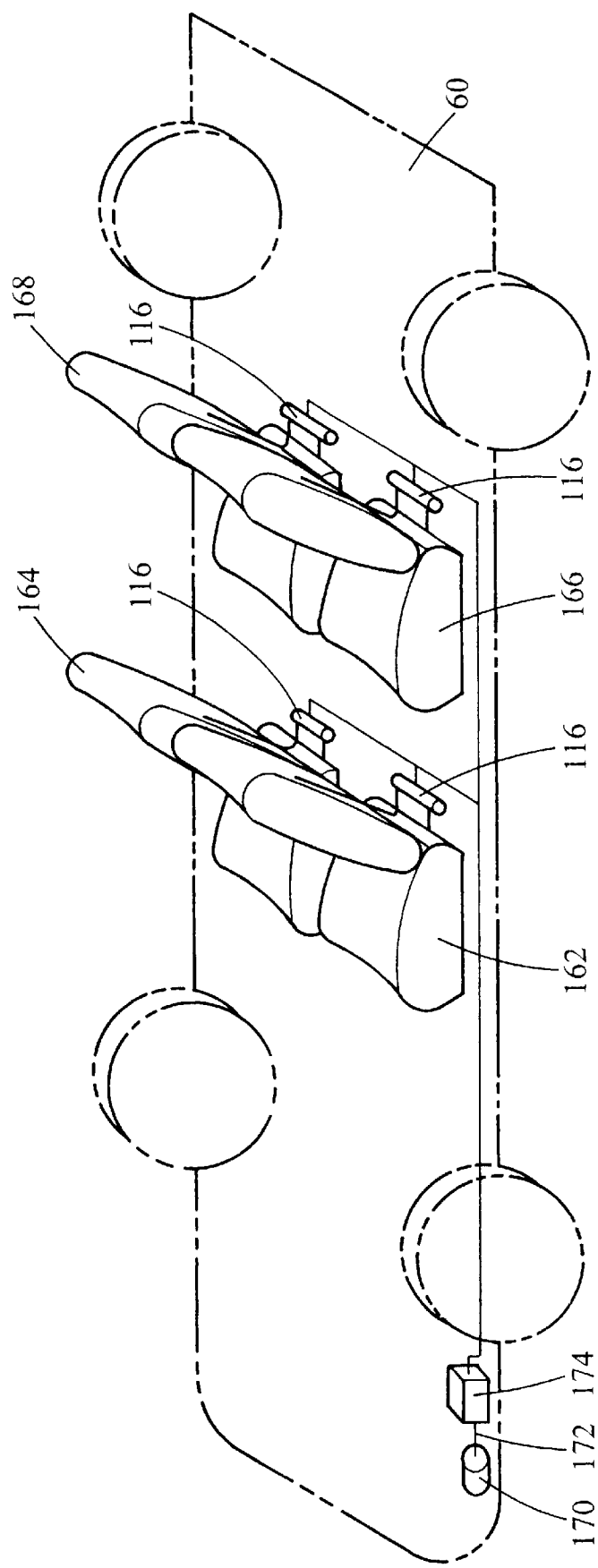
FIG. 3 is a schematic of a climatized seat system in an automobile in accordance with the present invention.

FIG. 3 illustrates a climatized seat system incorporated into an automobile 160. The system preferably includes all components discussed above, and similar reference numbers in FIG. 3 refer to similar components discussed above. The system is incorporated into a passenger automobile 160. The automobile 160 includes driver 162, passenger 164, and first 166 and second 168 rear seats.

Preferably, a vortex tube 116 is associated with each seat. This configuration allows a user in each seat to control the temperature or relative heat level of his or her seat independent of the other seats. Alternatively, a single vortex tube could be utilized to heat and/or cool all of the seats. Also alternatively, any arrangement of vortex tubes and seats could be used.

The climatization system also includes a compressor 170. The compressor 170 can comprise any known type of compressor capable of supplying compressed air to the vortex tube(s) 116. A compressor 170 dedicated to the climatization system can be used, or a compressor that is part of another vehicle system, such as the heating and/or air-conditioning system, can be incorporated into the climatization system. A supply line 172 connects to an output side of the compressor 170 and into the inlet 130 of the vortex tube(s) 116. In this configuration, the supply line 172 provides communication between the compressor 170 and the vortex tube(s) 116, and carries the compressed air from the compressor 170 into the spin chamber of the vortex tube(s) 116.

In order to prevent a need to run the compressor 170 each time a change in temperature of a seat is desired, an accumulator 174 or other chamber capable of storing compressed air can be included in the climatized seat system. Preferably, the accumulator 174 is positioned along the length of the air supply line 172. In this manner, the accumulator 174 can store compressed air output by the compressor 170 and direct it toward the vortex tube(s) 116 as the need arises.

The foregoing disclosure is the best mode devised by the inventors for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

We claim:

1. A climatized seat comprising:
   a frame;
   a support surface coupled to the frame; and
   a vortex tube having a first end, a second end, and an inlet adapted to be coupled to a source of compressed air;
   wherein the vortex tube separates compressed air entering through the inlet into hot and cold air streams, the hot air stream exits through the first end and the cold air stream exits through the second end, and wherein at least the hot air stream enters said seat.

2. A climatized seat in accordance with claim 1, wherein the seat has an interior; and further comprising a first conduit that provides communication with the interior of the seat.

3. A climatized seat in accordance with claim 2, further comprising a first passageway in communication with the first end of the vortex tube and the first conduit.

4. A climatized seat in accordance with claim 3, further comprising a first valve adapted to control passage of the hot air stream through the first passageway.

5. A climatized seat in accordance with claim 3, further comprising a second conduit that provides communication with the interior of the seat.

6. A climatized seat in accordance with claim 5, further comprising a second passageway in communication with the second end of the vortex tube and the second conduit.

7. A climatized seat in accordance with claim 6, further comprising a second valve adapted to control passage of the cold air stream through the second passageway.

8. A climatized seat in accordance with claim 6, further comprising a connector coupled to the first and second passageways and adapted to mix the hot and cold air streams.

9. A climatized seat in accordance with claim 8, wherein the connector comprises first and second inlets and first and second outlets.

10. A climatized seat in accordance with claim 8, wherein the connector has at least one valve adapted to control passage of the hot or cold air stream through the connector.

11. A climatized seat in accordance with claim 10, wherein the connector further comprises a valve adapted to allow entry of air from the environment surrounding said seat.

12. A climatized seat in accordance with claim 1, further comprising a valve adapted to control exit of the hot air stream from the first end of the vortex tube.

13. A climatized seat in accordance with claim 1, further comprising a valve adapted to control exit of the cold air stream from the second end of the vortex tube.

14. A method of heating and/or cooling a seat having an interior, comprising:
   providing a frame;
   providing a support surface coupled to the frame;
   providing a vortex tube having a first end, a second end, and an inlet coupled to a source of compressed air;
   passing compressed air through the inlet;
   separating compressed air into hot and cold air streams;
   passing the hot air stream through the first end of the vortex tube;
   passing the cold air stream through the second end of the vortex tube; and
   passing at least the hot air stream into the interior of the seat.

15. A method in accordance with claim 14, further comprising passing the hot air stream through a first passageway that communicates with the first end of the vortex tube and said interior of said seat.

16. A method in accordance with claim 15, further comprising passing the cold air stream through a second passageway that communicates with the second end of the vortex tube and said interior of said seat.

17. A method in accordance with claim 14, further comprising controlling the amount of air exiting the second end of the vortex tube.

18. A method in accordance with claim 17, wherein controlling the amount of air exiting the second end of the vortex tube comprises allowing up to and including 60% of the compressed air that entered the vortex tube through the inlet to exit through the second end of the vortex tube.

19. A method in accordance with claim 14, further comprising mixing the hot and cold air streams.

20. A method in accordance with claim 14, further comprising mixing either the hot or cold air stream with air from the environment surrounding said seat.

21. A seat climatization system, comprising:
   at least one seat;
   a compressor;
   at least one vortex tube having a first end, a second end, and an inlet; and
   a first passageway providing fluid communication between the compressor and the inlet;

wherein the compressor discharges compressed air that travels through the first passageway to the inlet, enters the vortex tube, and is separated into hot and cold air streams, the hot air stream exiting the vortex tube through the first end and the cold air stream exiting the vortex tube through the second end.

22. A seat climatization system according to claim 21, further comprising an accumulator disposed on the first passageway and positioned between the compressor and the vortex tube.

23. A seat climatization system according to claim 21, wherein said seat defines an opening.

24. A seat climatization system according to claim 23, further comprising a second passageway in communication with the first end of the vortex tube and the opening.

25. A seat climatization system according to claim 24, further comprising a valve for controlling passage of the hot air stream through the second passageway.

26. A seat climatization system according to claim 24, wherein the seat defines a second opening and said seat climatization system further comprises a third passageway in communication with the second end of the vortex tube and the second opening.

27. A seat climatization system according to claim 26, further comprising a valve for controlling passage of the cold air stream through the third passageway.

* * * * *